H. ARNOLD.
NUT LOCK.
APPLICATION FILED NOV. 21, 1917.
1,288,467.
Patented Dec. 24, 1918.
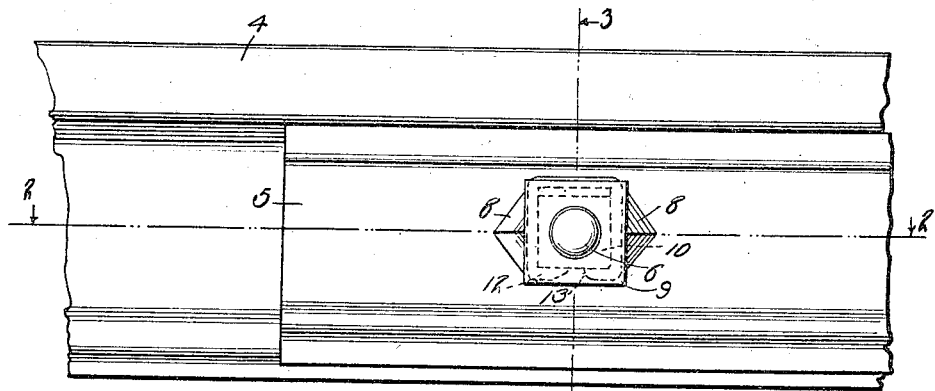
FIG. 1.
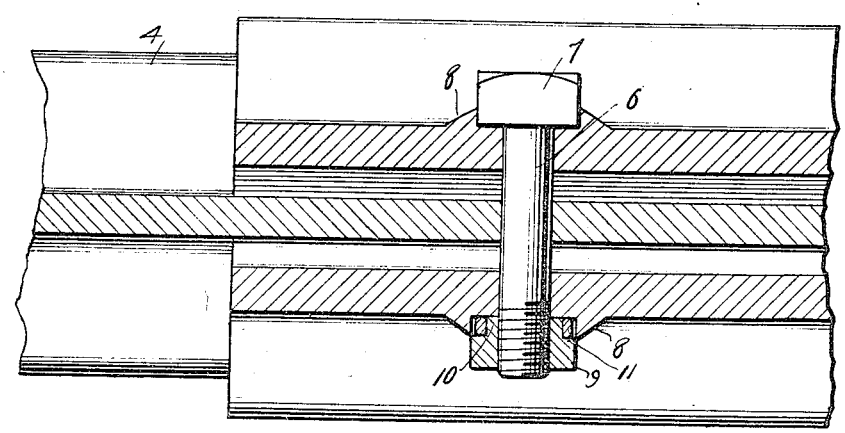
FIG. 2.
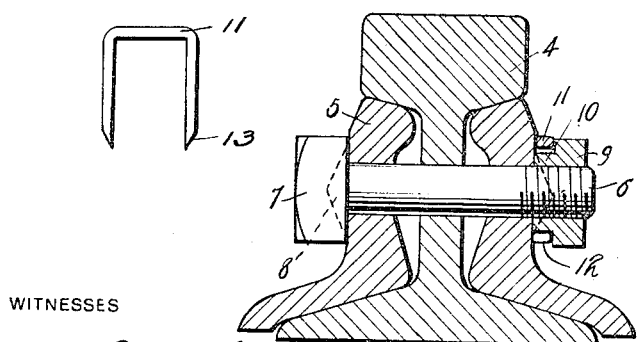
FIG. 4.
FIG. 3.
WITNESSES
W. C. Fielding
INVENTOR
Harry Arnold
BY Richard Owen
ATTORNEY

UNITED STATES PATENT OFFICE.

HARRY ARNOLD, OF BREMERTON, WASHINGTON.

NUT-LOCK.

1,288,467.   Specification of Letters Patent.   Patented Dec. 24, 1918.

Application filed November 21, 1917. Serial No. 203,259.

*To all whom it may concern:*

Be it known that I, HARRY ARNOLD, a citizen of the United States, residing at Bremerton, in the county of Kitsap and State of Washington, have invented certain new and useful Improvements in Nut-Locks, of which the following is a specification.

My invention relates to new and useful improvements in nut locks and is more particularly of the type used in connection with bolts used to connect two sections of a rail.

An important object of my invention is to provide a device of the above mentioned character including projections formed upon a fish plate for indirect coöperation with the nut received upon the end of the bolt, by means of a flexible key to restrict the nut against movement.

Another object of my invention is the provision of projections formed upon a fish plate in a novel shaped manner, whereby it becomes an easy task to remove the flexible key which is interposed between the nut and these projections, if it is so desired.

A further object of my invention is to provide a device of the above mentioned character which is strong, durable, inexpensive to manufacture, and efficient in practice.

Other objects and advantages will be apparent during the course of the following description.

In the accompanying drawings wherein like numerals are employed to designate like parts throughout the same, Figure 1 is a side elevation of the device locked in position upon a rail.

Fig. 2 is a horizontal section of the same taken on line 2—2 of Fig. 1.

Fig. 3 is a vertical section of the same taken on line 3—3 of Fig. 1, and

Fig. 4 is an elevation of my flexible locking key.

In the drawings wherein for the purpose of illustration is shown a preferred example of the invention, the numeral 4 designates the portion of a rail adjacent its end, which is provided with a plurality of openings through the web thereof. Only one opening is shown in the present instance. The fish plates 5 are also provided with a plurality of openings adapted to aline for the reception of a usual bolt 6. The head 7 of this bolt is preferably square for a purpose to be hereinafter set forth.

Upon the outer face of each fish plate, adjacent each opening therethrough, are formed a pair of oppositely arranged projections 8, the inner or perpendicular face of which is flat. The two outer faces of the projections are beveled off from the center thereof in opposite directions, which is more clearly shown in Fig. 1. It will be noted that by beveling these projections, as set forth, a space is provided whereby the locking key may be readily locked or unlocked into or out of engagement with the nut. These projections 8 extend substantially the length of one side of the nut for a purpose to be hereinafter brought forth. The nut 9 is provided on its lower face with a reduced square portion 10, and is of substantial width from corner to corner to permit the same to rotate between the projections 8, in order that the lower face of this reduction may engage the portion of the fish plate between the said projections.

After the nut has been tightened upon the bolt so that one of the faces thereof is parallel to the perpendicular or flat side of the projections 8, a flexible U shaped key 11 is inserted between the nut and the projection. This is accomplished by passing the two parallel arms of the key through the passageway between the nut and the projections until the portion of the key connecting these two arms engages a flat portion of the reduced member 10. The arms of this flexible key are of greater length than the sides of the reduction 10 and are adapted to be pointed at their free ends as at 13, by cutting away their ends, diagonally inward from their outer edge to the inner edge, and are bent into close engagement with the fourth side of the reduction 10. By providing the cutaway ends as set forth a suitable tool may be engaged with the free ends of the arms to disengage them from the nut when desired. It will be readily recognized that the arms of this key will occupy the space between the reduced portion 10 and the projections, and thereby prevent the nut from rotating. By providing the projections so that their ends are arranged adjacent the ends of the side of the nut which is adjacent the projections, it will be readily apparent that the free ends of the key may be bent into alinement with the arms of the key to facilitate easy removal of the key from between the reduced portion of the nut and the projections.

The head 7 of the bolt 6 is to be of such width that it will be snugly engaged between the two projections 8 and thereby be prevented against rotation.

To apply this nut lock to the rail joint, a square headed bolt 6 is passed through the openings in the rail and fish plates, so that the flat sides of the head 7 contact with the flat or perpendicular portions of the projections 8, and the under side of the head engages the portion of the fish plate surrounding this opening. The nut 9 is then screwed upon the thread end of the bolt which projects a substantial distance beyond the opposite fish plate, until the under side of the reduced portion engages the portion of the fish plate surrounding the opening therethrough, and the flat side of the reduced portion lies parallel to the perpendicular or flat portions of the projections 8. The flexible U shaped key 11 is then inserted between the reduced portion 10 and the projections so that the parallel arms thereof occupy the space between these two members, and the under side of the member connecting these two arms engages the third flat portion of the reduction 10. The free ends of the arms of the flexible key are then bent around the fourth side of the reduction 10 as more clearly shown in Fig. 1 of the accompanying drawings.

To remove the nut from the bolt, the portions 12 of the arms of the flexible key are bent to aline with their respective arms, thereby allowing the parallel arms of the flexible key to be withdrawn from the passageway formed by the side of the reduction and the flat portion of the beveled projections. It will be clearly seen that the nut 9 may be freely rotated between the projections 8 thereby allowing the nut to be disengaged with the thread end of the bolt. To remove the bolt from the rail joint, it is only necessary to give the thread end of the bolt a slight tap, thereby forcing the head 7 thereof from between the two projections 8 upon the opposite fish plate.

It is to be understood that the form of my invention herewith shown and described is to be taken as a preferred example of the same, and various changes in the shape, size, and arrangement of parts will be resorted to without departing from the spirit of the invention or the scope of the subjoined claims.

Having described my invention, I claim,

1. In combination with a bolt and nut, said nut having its lower end reduced and shaped similar to the sides of the nut, a plate having an opening therethrough, a pair of projections upon said plate arranged oppositely of said opening, a flexible U shaped key engaging three faces of said reduced portion of the nut, the arms of said U shaped key being arranged between opposite faces of the reduced portion and the projections, and the free ends of said U shaped key being adapted to be bent to engage the reduced portion, said free ends being cutaway diagonally inward from their outer edges to their inner edges to provide abutments for suitable tools for removing said key when desired.

2. In combination with a bolt and nut, said nut having its lower end reduced and shaped similar to the sides of the nut, a plate having an opening therethrough, a pair of projections upon said plate arranged oppositely of said opening and extending to the ends of one side of the reduced portion of the nut, a flexible U shaped key having its parallel arms engaging opposite sides of the reduced portion and interposed between the projections and the reduced portion, and the free ends of said key being bent to engage the side of the reduced portion adjacent said opposite sides so that the free ends of said parallel arms may be bent into alinement with the parallel arms by said parallel arms engaging said projections.

3. A nut lock comprising work, a plate upon opposite sides of said work, said plates and work having alined openings therethrough, said plates each having a pair of projections oppositely arranged of said openings, a bolt having a square head and adapted to be passed through said openings so that the opposite sides of said head will be snugly engaged by said projections on one plate to prevent rotation of the bolt, a nut upon said bolt and having a reduced inner end arranged between said projections or the other plate and a U shaped key having its parallel arms engaging opposite sides of the reduced portion of the nut and arranged between the projections and said reduced portion to prevent rotation of the nut, the free ends of said arms being bent to engage with the side of the reduced portion adjacent the sides of the reduced portion which are engaged by the parallel arms of the U shaped key.

In testimony whereof I affix my signature in presence of two witnesses.

HARRY ARNOLD.

Witnesses:
 M. A. SPAULDING,
 DELLA J. SPAULDING.